(12) United States Patent
Kong et al.

(10) Patent No.: US 8,047,177 B2
(45) Date of Patent: Nov. 1, 2011

(54) CYLINDER HEAD HAVING AN INTEGRALLY FORMED PORT-EXHAUST MANIFOLD ASSEMBLY

(75) Inventors: Jin Kook Kong, Suwon (KR); Sihun Lee, Seoul (KR); Wootae Kim, Suwon (KR); Yooshin Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 551 days.

(21) Appl. No.: 12/332,592

(22) Filed: Dec. 11, 2008

(65) Prior Publication Data
US 2009/0151687 A1 Jun. 18, 2009

(30) Foreign Application Priority Data
Dec. 12, 2007 (KR) .................... 10-2007-0129395

(51) Int. Cl.
*F02F 1/42* (2006.01)
(52) U.S. Cl. ............... 123/193.5; 123/193.3; 123/193.2; 60/323

(58) Field of Classification Search ............... 123/193.5, 123/193.2, 193.3; 60/323
See application file for complete search history.

(56) References Cited

U.S. PATENT DOCUMENTS

| | | | | |
|---|---|---|---|---|
| 4,796,426 | A * | 1/1989 | Feuling | 60/313 |
| 6,199,376 | B1 * | 3/2001 | Maeda | 60/323 |
| 6,962,048 | B2 * | 11/2005 | Ashida et al. | 60/302 |
| 2008/0083213 | A1 * | 4/2008 | Tanada et al. | 60/297 |
| 2009/0151343 | A1 * | 6/2009 | Son et al. | 60/323 |

FOREIGN PATENT DOCUMENTS
JP 01-182560 7/1989

* cited by examiner

*Primary Examiner* — Michael Cuff
*Assistant Examiner* — James Kim
(74) *Attorney, Agent, or Firm* — Morgan, Lewis & Bockius LLP

(57) ABSTRACT

A cylinder head having a plurality of integrally formed port-exhaust manifold assemblies therein, wherein the port-exhaust manifold assembly is integrally formed in the cylinder head by extending a plurality of exhaust port of an engine to function as an exhaust manifold and the plurality of the port-exhaust manifold assemblies is arranged in a triangle when each center portion of outlet portions thereof are connected.

18 Claims, 16 Drawing Sheets

CYLINDER HEAD HAVING AN INTEGRALLY FORMED PORT-EXHAUST MANIFOLD ASSEMBLY

CROSS-REFERENCE TO RELATED APPLICATION

The present application claims priority to Korean Patent Application No. 10-2007-0129395 filed on Dec. 12, 2007, the entire contents of which application is incorporated herein for all purposes by this reference.

BACKGROUND OF THE INVENTION

1. Field of the Invention

The present invention relates to a cylinder head having an integrally formed port-exhaust manifold assembly, more particularly, the present invention relates to a cylinder head having an integrally formed port-exhaust manifold assembly in which an exhaust port is extended to function as an exhaust manifold.

2. Description of Related Art

Generally, the exhaust manifold has developed as another component. The exhaust manifold is independently manufactured and then mounted on the cylinder head.

Accordingly, it is an important factor in that it may largely affect an engine on an entire performance and durability and it may thermally deteriorate a vehicle.

The vehicle must have a space for accommodating such an exhaust manifold in an engine compartment. Also, the vehicle must have a sufficient space for separating peripheral components from the exhaust manifold not to thermally deteriorate the same.

Meanwhile, such an exhaust manifold requests that a catalyzing means is enough near to rapidly activate the exhaust manifold. Accordingly, it is desired that the exhaust manifold are compactly disposed in the engine.

However, in case of a V6 engine in which six cylinders are disposed in a V-shaped pattern such that each three cylinders are arranged at an angle of 60° at left and right sides based on a center line, it is difficult to satisfy all of two opposed conditions in which one is providing a sufficient space for thermally insolating the exhaust manifold and a thermal-insulating means to be additionally mounted in a cylinder head and the other is providing a close space for the catalyzing means to be near to the exhaust manifold.

In order to satisfy all of two opposed space conditions, the shape of the exhaust manifold cannot help being rapidly changed.

Such a rapid shape change of the exhaust manifold may provide a loss of a performance, a further distance from the catalyzing means, and a loss of the thermal durability and accordingly, a thermal stress is converged on to generate a crack.

In addition, in order to make an engine compact, Japan Patent No. 2709815 discloses that the exhaust manifold is integrally formed with the exhaust port in a cylinder head of a series three cylinder engine.

With such a structure, for example, in case of a series four cylinder engine, it has a merit in that the compact engine may be achieved because the function of the exhaust manifold is performed in the cylinder head.

However, it has a drawback in that a torque is decreased at a low velocity and at a middle velocity since the pulsatory motion interference according to an increase of the number of the cylinder heads is generated on exhausting, which is an important characteristic of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a cylinder head having an integrally formed port-exhaust manifold assembly having advantages of making a shape of exhaust outlet portions of the integrally formed port-exhaust manifold assemblies compact and preventing the integrally formed port-exhaust manifold assemblies from a thermal damage by disposing the plurality of port-exhaust manifold assemblies in two piled stories and disposing the cooling water jacket into a space between the plurality of port-exhaust manifold assemblies in an V6 engine in which six cylinders are disposed in a V-shaped pattern such that each three cylinders are arranged at an angle of 60° at left and right sides based on a center line, each pair of exhaust ports among twelve exhaust ports thereof are extended to form 6 pair of Y-shaped exhaust inlet lines to function as a exhaust manifold.

In an aspect of the present invention, a cylinder head having an integrally formed port-exhaust manifold assembly is provided to have a shape of exhaust outlet portions of the integrally formed port-exhaust manifold assemblies compact and preventing the integrally formed port-exhaust manifold assemblies from a thermal damage by disposing the plurality of port-exhaust manifold assemblies in two piled stories and disposing the cooling waterjacket into a space between the plurality of port-exhaust manifold assemblies when a plurality of cylinders are in parallel disposed.

In another aspect of the present invention, a cylinder head having an integrally formed port-exhaust manifold assembly is provided to reduce production cost and the entire weight when the exhaust manifold, which is traditionally separated, is integrally formed and interworked with the exhaust port in a cylinder.

In further another aspect of the present invention, a cylinder head having an integrally formed port-exhaust manifold assembly is provided to reduce production cost and the entire weight when the traditional exhaust manifold additionally composed of a high density of iron material is integrally formed in the cylinder head and is manufactured by a low density of aluminum alloy to eliminate the exhaust manifold.

In still another aspect of the present invention, a cylinder head having an integrally formed port-exhaust manifold assembly is provided to decease an exhaust temperature by at maximum 100 C° by reducing a distance of between the cylinder head and the catalyzing means, and mounting TCI engine to a Diesel VGT, and improving a torque at a low and middle velocity and increasing an engine power.

In an aspect of the present invention, a cylinder head having an integrally formed port-exhaust manifold assembly is provided to increase the degree of interference freedom, insuring the most compact shape without rapidly changing the shape of the exhaust manifold.

The methods and apparatuses of the present invention have other features and advantages which will be apparent from or are set forth in more detail in the accompanying drawings, which are incorporated herein, and the following Detailed

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
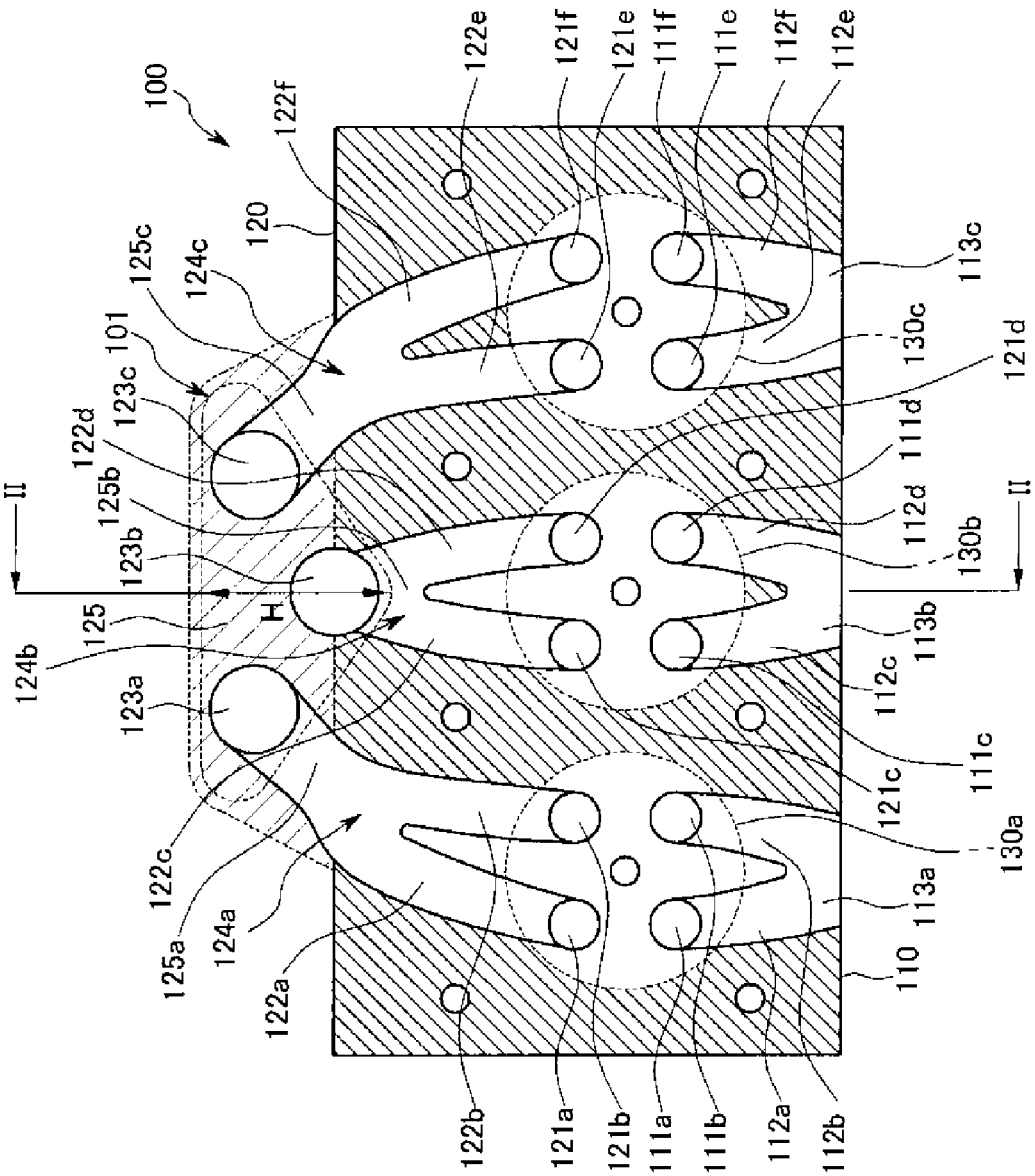
FIG. 1 is a top view of an exemplary cylinder head having a plurality of port-exhaust manifold assemblies according to the present invention.
Figure 2:
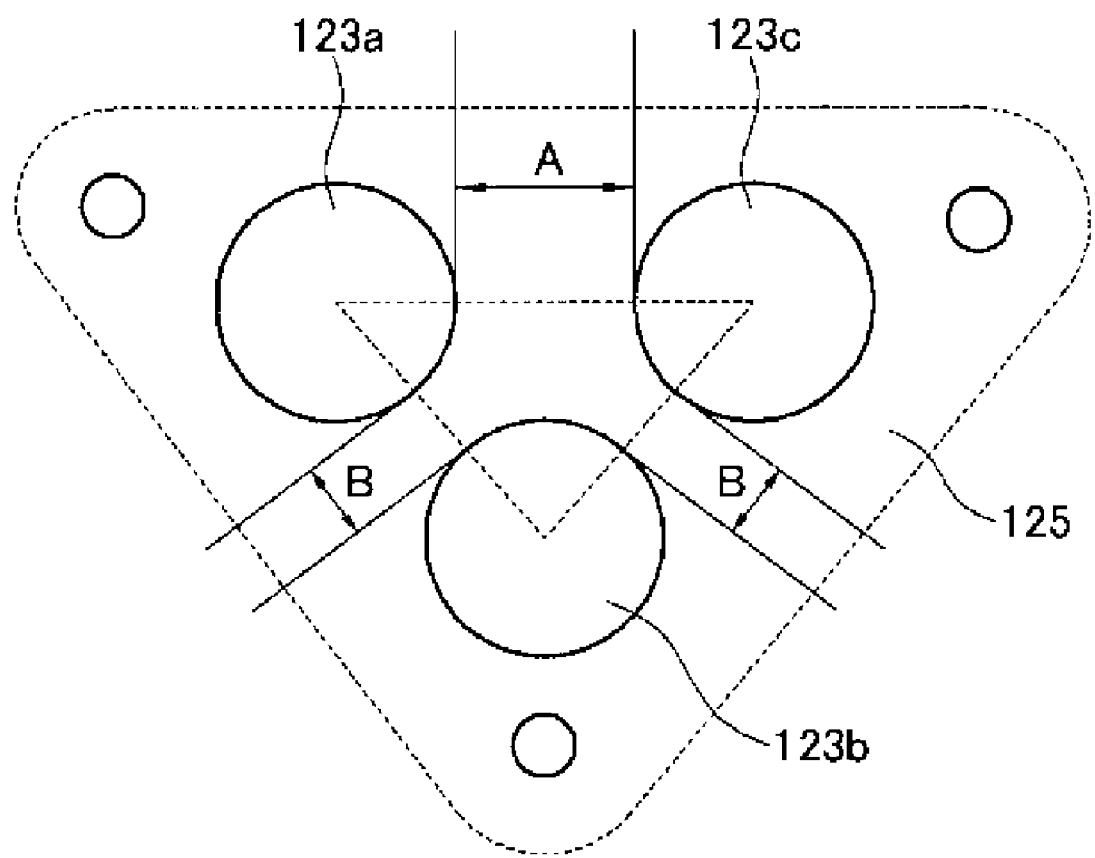
FIG. 2 is a top view for showing an exemplary exhaust port of a cylinder head according to the present invention.
Figure 3:
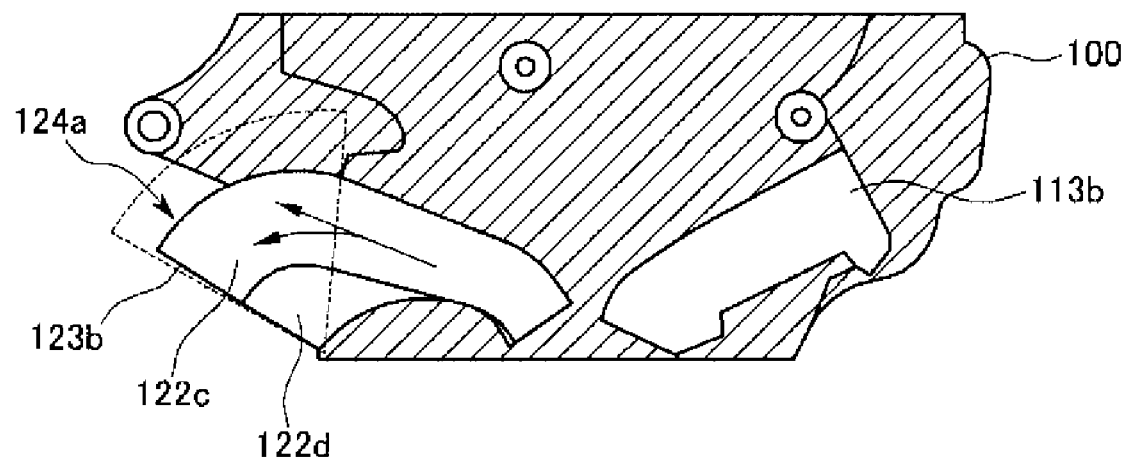
FIG. 3 is a cross-sectional view taken along line II-II of FIG. 1.

FIG. 1 is a top view of a cylinder head having a plurality of port-exhaust manifold assemblies according to various embodiments of the present invention, FIG. 2 is a top view for showing an exhaust port of a cylinder head according to various embodiments of the present invention, and FIG. 3 is a cross-sectional view taken along line II-II of FIG. 1. Now, a cylinder head having a plurality of port-exhaust manifold assemblies according to various embodiments of the present invention will be described in detail.

In the specification, the term "port-exhaust manifold assembly" relates to a structure in which an exhaust port is extended to form an exhaust flowing line to be functioned as an exhaust manifold.

According to various embodiments of the present invention, a cylinder head 100 is composed of an engine of vehicle or the like. When it is assembled to the engine, the cylinder head 100 is mounted with a cylinder cover at an upper portion thereof and a cylinder block at a lower portion thereof in an otherwise conventional manner.

According to various embodiments of the present invention, the cylinder head 100 is directed to three cylinder heads disposed at a right portion among a V6 engine in which six cylinders are disposed in a V-shaped pattern such that each three cylinders are arranged at an angle of 60° at left and right portions based on a center line.

In the specification, the three cylinder heads disposed at left has the same structure as the three cylinder heads disposed at right and thus the description thereof is omitted.

As shown in FIG. 1 to FIG. 3, the cylinder head 100 includes six intake ports, for example, first, second, third, fourth, fifth, and sixth 111a, 111b, 111c, 111d, 111e, and 111f intake ports communicated with the three cylinders, for example, first, second and third cylinders 130a, 130b, and 130c. The six intake ports, for example, first, second, third, forth, fifth, and sixth 111a, 111b, 111c, 111d, 111e, and 111f intake ports are disposed at an upper portion of the cylinder block of the engine.

The six intake ports 111a, 111b, 111c, 111d, 111e, and 111f are allocated to the three cylinders 130a, 130b, and 130c such that two intake ports are corresponding to a single cylinder.

More specifically, the first and second intake ports 111a and 111b are allocated to the first cylinder 130a, the third and fourth intake ports 111c and 111d are allocated to the second cylinder 130b, and the fifth and sixth intake ports 111e and 111f are allocated to the third cylinder 130c.

Similarly, the six intake ports disposed at left based on a center line of the V6 engine are allocated such that they are communicated with the three cylinders at the upper portion of the cylinder block of the engine.

The two intake ports allocated to each cylinder are arranged such that they are gathered to an intake end portion 110 thereof in a Y-shaped pattern.

The intake end portion 110 includes each one inlet portion opened in correspondence with each one cylinder 130a, 130b, and 130c.

Specifically, the first and second intake ports 111a and 111b allocated to the first cylinder 130a are extended toward the intake end portion 110 of the cylinder head 100 to form the first and second flowing lines 112a and 112b and the first and second flowing lines 112a and 112b are gathered in a Y-shaped pattern so that they are connected to a first inlet portion 113a at an end portion thereof, the third and fourth intake ports 111c and 111d allocated to the second cylinder 130b are extended toward the intake end portion 110 of the cylinder head 100 to form third and fourth flowing lines 112c and 112d and the third and fourth flowing lines 112c and 112d are gathered in a Y-shaped pattern so that they are connected to a second inlet portion 113b at an end portion thereof, and the fifth and sixth intake ports 111e and 11 if allocated to the third cylinder 130c are extended toward the intake end portion 110 of the cylinder head 100 to form fifth and sixth flowing lines 112e and 112f and form the fifth and sixth flowing lines 112e and 112f are gathered in a Y-shaped pattern so that they are connected to a third inlet portion 113c at an end portion thereof Accordingly, each cylinder 130a, 130b, and 130c has the first to the third inlet portions 113a, 113b, and 113c which is independently open at the intake end portion 110 of the cylinder head.

According to various embodiments of the present invention, the cylinder head 100 includes three port-exhaust manifold assemblies 124a, 124b, and 124c, for example, first, second, and third port-exhaust manifold assemblies 124a, 124b, and 124c of which six exhaust ports 112a, 121b, 121c, 121d, 121e, and 121f communicated with the three cylinder 130a, 130b, and 130c are extended to function as an exhaust manifold at the exhaust side end portion 120 of the right cylinder head as shown in FIG. 1 to FIG. 3.

The six exhaust ports 121a, 121b, 121c, 121d, 121e, and 121f are allocated to the first to third cylinders 130a, 130b, and 130c such that two exhaust ports are corresponding to the one cylinder.

Specifically, the first and second exhaust ports 121a and 121b are allocated to the first cylinder 130a, the third and fourth exhaust ports 121c and 121d are allocated to the second cylinder 130b, and the fifth and sixth exhaust ports 121e and 121f are allocated to the third cylinder 130c.

At this time, according to various embodiments of the present invention, the first and second exhaust ports 121a and 121b allocated to the first cylinder 130a are extended toward an exhaust end portion 120 of the cylinder head to form first and second outflow lines 122a and 122b and the first and second outflow lines 122a and 122b are gathered in a Y-shaped pattern to form a first exhaust flowing line 125a so that the first exhaust flowing line 125a is connected to a first outlet portion 123a at an end portion thereof the third and fourth exhaust ports 121c and 121d allocated to the second cylinder 130b are extended toward the exhaust end portion 120 of the cylinder head to form third and fourth outflow lines 122c and 122d and the third and fourth outflow lines 122c and 122d are gathered in a Y-shaped pattern to form a second exhaust flowing line 125b so that the second exhaust flowing line 125b is connected to a second outlet portion 123b at an end portion thereof and the fifth and sixth exhaust ports 121e and 121f allocated to the third cylinder 130c are extended toward the exhaust side end portion 120 of the cylinder head to form fifth and sixth outflow lines 122e and 122f and the fifth and sixth outflow lines 122e and 122f are gathered in a Y-shaped pattern to form a third exhaust flowing line 125c so that the third exhaust flowing line 125c is connected to a third outlet portion 123c at an end portion thereof.

The first to third outlet portions 123a, 123b, and 123c are disposed with being piled up one on another in two stories as shown in FIG. 1 so that they are entirely composed of a triangle when they are connected based on the center of the outlet portions as shown in FIG. 2 and they are combined to catalytic converter though an aperture for bonding the catalyzing means disposed at a triangle flange portion 125. According to various embodiments of the present invention, the first outlet portion 123a of the first and second exhaust ports 121a and 121b allocated to the first cylinder 130a is symmetrical to the third outlet portion 123c of the fifth and sixth exhaust ports 121e and 121f allocated to the third cylinder 130c. The second exhaust portion 123b of the third and fourth exhaust ports 121c and 121d allocated to the second cylinder 130b is disposed at a center, Thus, the first to sixth exhaust ports 121a, 121b, 121c, 121d, 121e, and 121f are extended to a diffuser of the catalytic converter to form the first, second, and third port-exhaust manifold assemblies 124a, 124b, and 124c. That is, the three port-exhaust manifold assemblies 124a, 124b, 124c includes the first port-exhaust manifold assembly 124a having the first outlet portion 123a at an end portion of the first exhaust flowing line 125a among the three exhaust flowing lines 125a, 125b and 125c, a second port-exhaust manifold assembly 124b having a second outlet portion 123b at an end portion of the second exhaust flowing line 125b, and a third port-exhaust manifold assembly 124c having a third outlet portion 123c at an end portion of the third exhaust flowing line 125c.

Accordingly, the cylinder head 100 has an outer wall portion 101 enlarged such that it includes the first to the third port-exhaust manifold assemblies 124a, 124b, and 124c extended to the diffuser of a front portion of the catalytic converter over the traditional outer wall portion to function an exhaust manifold.

At this time, the outlet portions 123a, 123b, and 123c of the port-exhaust manifold assemblies may be bent or not be bent toward the catalytic converter as shown in FIG. 3. When the traditional exhaust ports are extended to the diffuser disposed at a front portion of the catalytic converter to form the outlet portions 123a, 123b, and 123c of the port-exhaust manifold assemblies in this manner, a distance of between the cylinder head 100 and the catalyzing means may be shortened and a catalyzing means activation start temperature (LOT; Light of Temperature) may be lowered so that engine displacement may be reduced. In addition, the traditional exhaust manifold additionally composed of a high density of iron material is integrally formed in the cylinder head 100 which is manufactured by a low density of aluminum alloy so that the elimination of the exhaust manifold may reduce production cost and the entire weight of the engine may be reduced.

In addition, the first to third outlet portions 123a, 123b, and 123c of the port-exhaust manifold assemblies 124a, 124b, and 124c are disposed with being piled up one on another in two stories and they are entirely composed of a triangle when they are connected based on the center of the outlet portions. The two of them may be selectively disposed at an upper story or at a lower story.

Accordingly, the degree of interference freedom may be increased and such an arrangement may insure the most compact exhaust outlet flange 125 so that the entire size of the cylinder head having the integrally formed port-exhaust manifold assembly may be largely reduced.

At this time, each distance A and B between each outlet portion 123a, 123b, and 123c may be in range of at least 3 to 15 mm.

Each distance A and B between each outlet portion 123a, 123b, and 123c is determined considering a cooling performance according to an arrangement of cooling means.

That is, an exhaust temperature may be reduced to at most 100° C. according to a size of a waterjacket so that it may largely a thermal durability compared to the traditional exhaust manifold.

In addition, the cooling means are disposed among each outlet portion 123a, 123b, and 123c so that the entire size of the engine may be compacted as well as the good cooing efficiency may be provided.

The structure of the cylinder head having a port-exhaust manifold assembly according to various embodiments of the present invention may simultaneously optimize an arrangement of the cooling means.

That is, the entire size of the cylinder head may be compacted and simultaneously the thermal durability of between each port-exhaust manifold assembly may be insured. The cooling means according to various embodiments of the present invention will be described with reference to FIG. 4A to FIG. 4C.

Figure 4A:
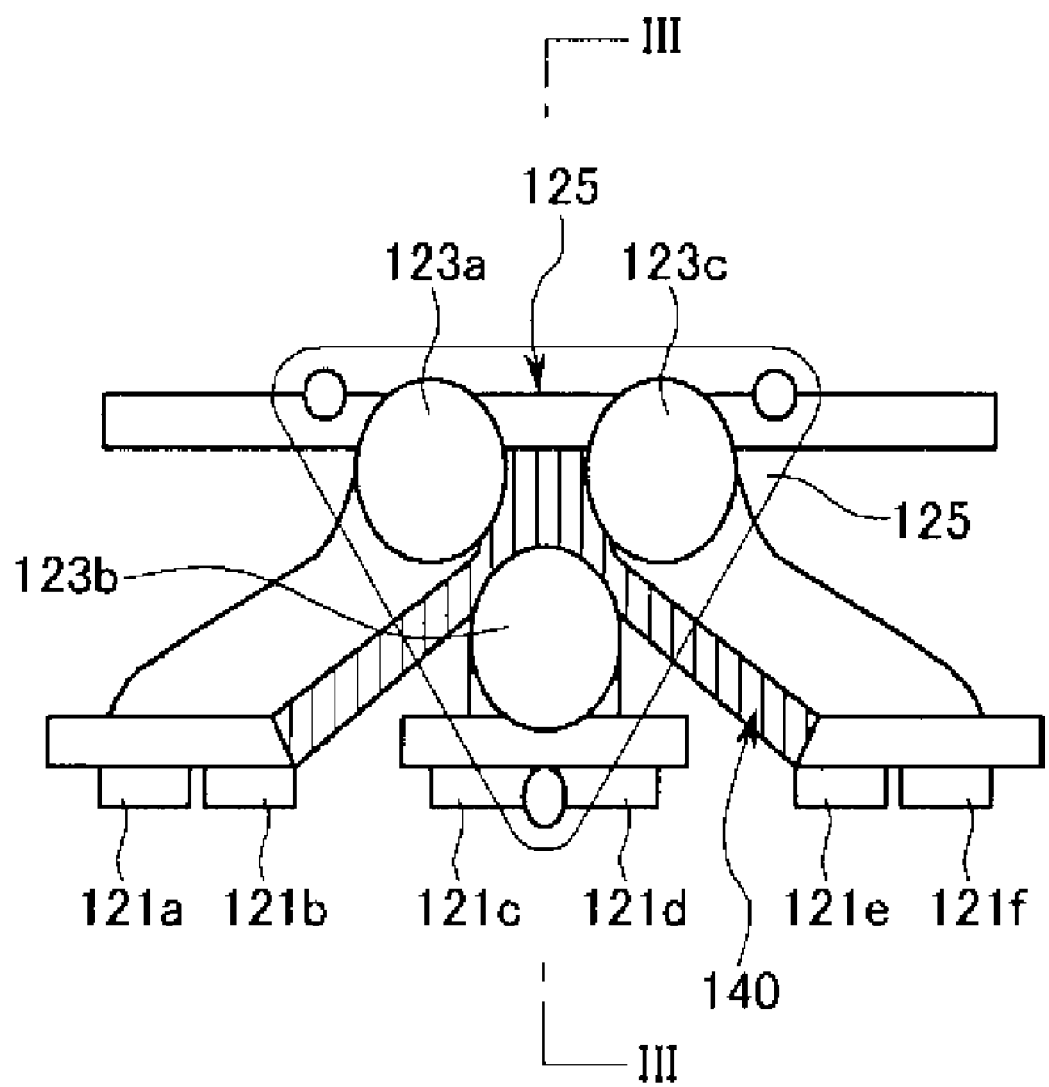
FIG. 4A is a top view for showing an exemplary arrangement of a water jacket surrounding an exhaust port of a cylinder head according to the present invention.
Figure 4B:
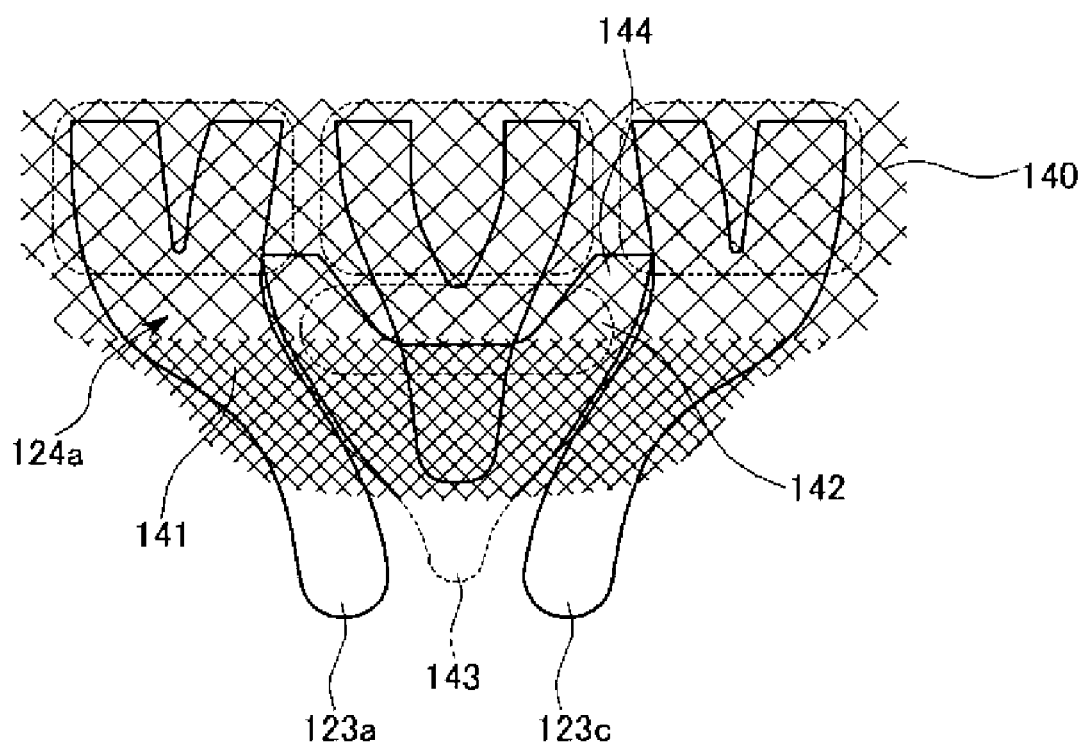
FIG. 4B is a front view for showing an exemplary arrangement of a water jacket in an exhaust port of a cylinder head according to the present invention.
Figure 4C:
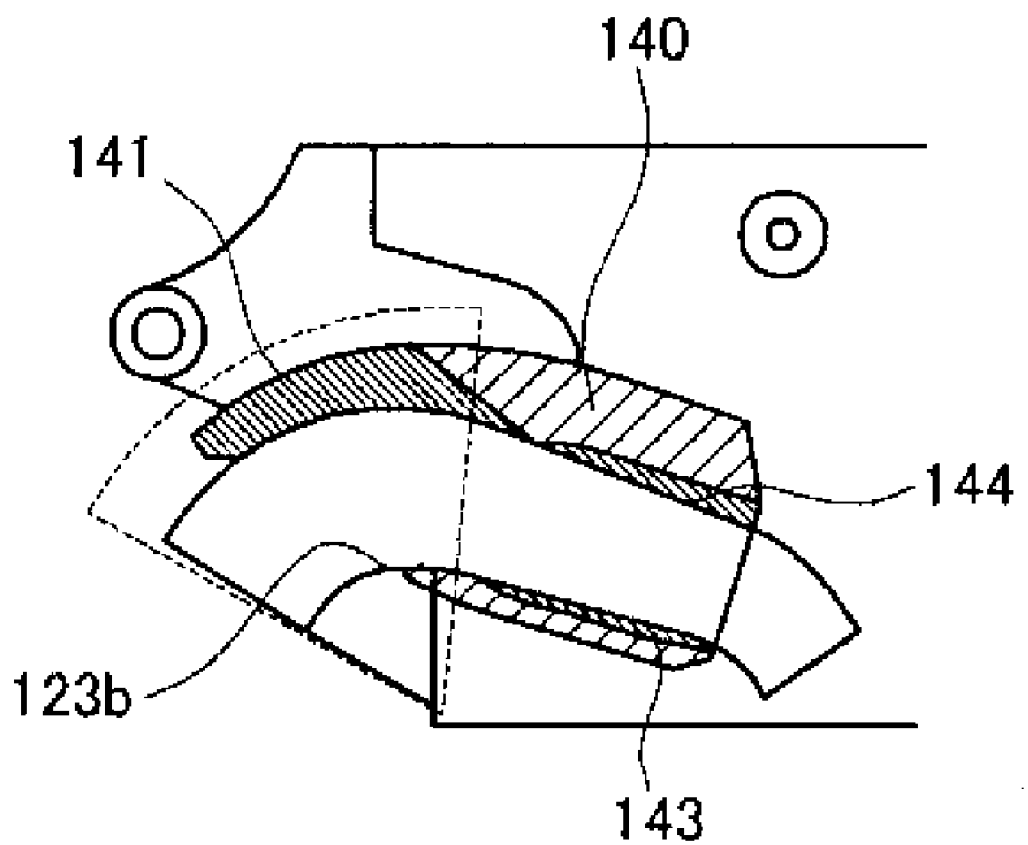
FIG. 4C is a cross-sectional view taken along line III-III of FIG. 4A.

FIG. 4A is a top view for showing a disposition of a water jacket in an exhaust port of a cylinder head according to various embodiments of the present invention, FIG. 4B is a front view for showing a disposition of a water jacket in an exhaust port of a cylinder head according to various embodiments of the present invention, and FIG. 4C is a cross-sectional view taken along line III-III of FIG. 4A.

In the cylinder head 100 according to various embodiments of the present invention, since the port-exhaust manifold assemblies 124a, 124b, and 124c are disposed with being piled up one on another in two stories, a sunken space portion is formed between the first and third port-exhaust manifold assemblies 124a and 124c disposed at a upper portion of the second port-exhaust manifold assembly 124b so that the water jacket may be inserted into the sunken space without making additional space as shown in FIG. 4A to FIG. 4C.

Essentially, the water jacket 140 includes a first cooling portion 141 enlarged than the traditional waterjacket as to surround the upper portion of the three port-exhaust manifold assemblies 124a, 124b, and 124c, a second cooling portion 142 enlarged from the first cooling portion 141 such that it is disposed at a sunken space of the upper portion of the second port-exhaust manifold assembly 124b which is arranged between the first and third port-exhaust manifold assemblies 124a and 124c, and a third cooling portion 143 probably extended to the outlet portions 123a, 123b, and 123c of the three port-exhaust manifold assemblies 124a, 124b, and 124c from the second cooling portion 142, and a fourth cooling portion 144 extended from the second cooling portion 142 such that it is connected with the first cooling portion 141 disposed at a lower portion of each exhaust port.

Meanwhile, in the traditional V6 engine, generally three exhaust ports per each bank are manufactured as a single core and then the single core is integrally attached on manufacturing the cylinder head. However, when each port-manifold assembly is piled one on another as described above, it is difficult to manufacture each port-manifold assembly as the traditional single core.

In such a case, each port-exhaust manifold assembly is independently manufactured as a separate core and then sequentially each separate core is attached to the mold. How to improve a productivity of the port-exhaust manifold assembly according to various embodiments of the present invention will be described with reference to FIG. 5A and FIG. 5B.

Figure 5A:
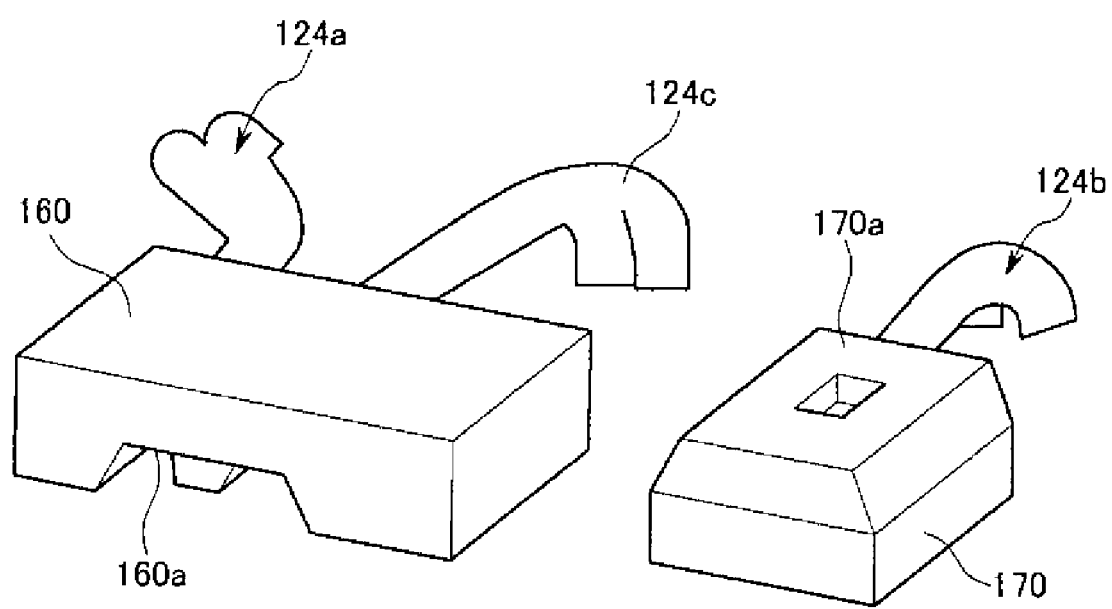
FIG. 5A is a schematic perspective view for showing an exemplary core for mounting a port-exhaust manifold assembly in a cylinder head according to the present invention.
Figure 5B:
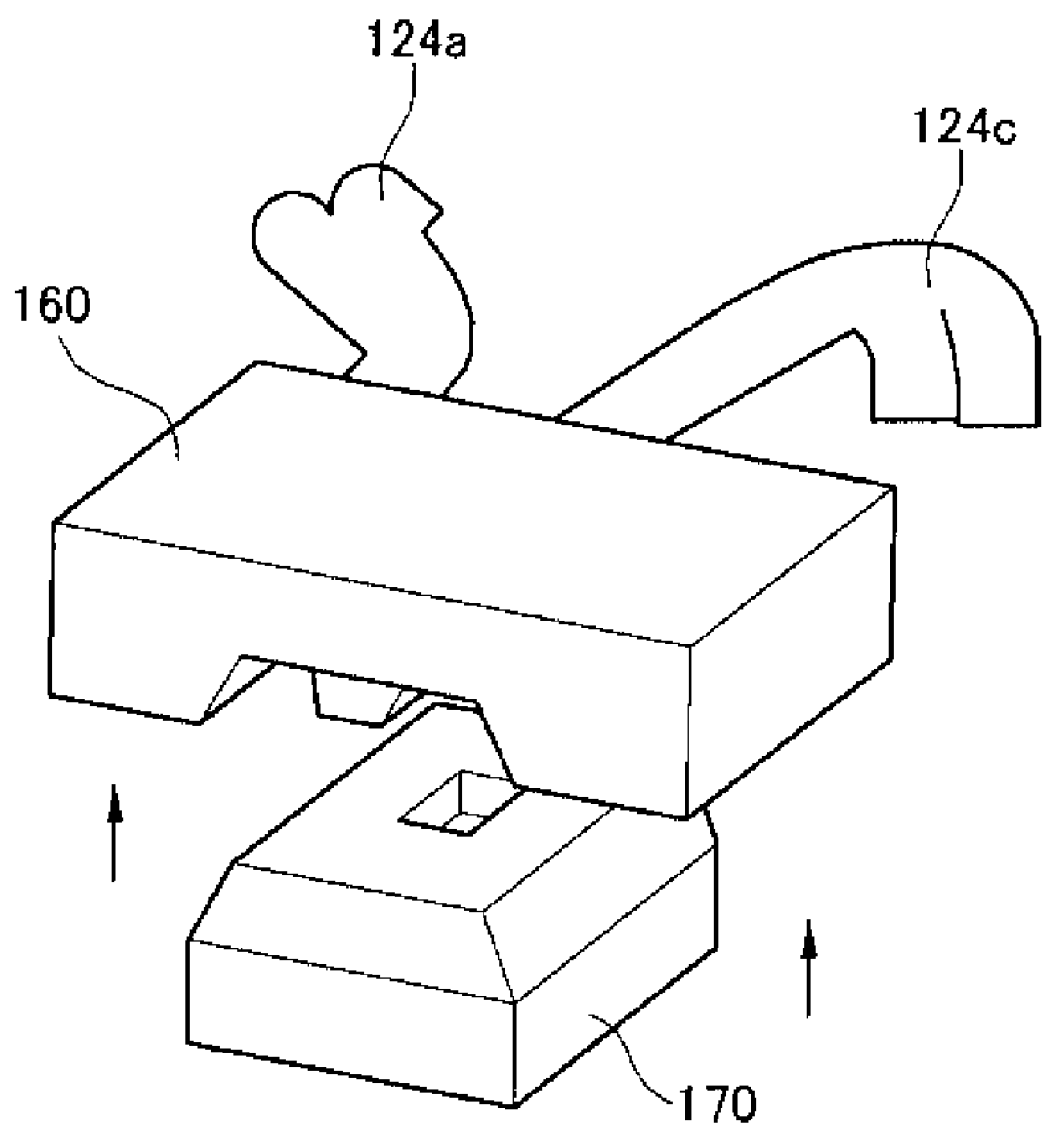
FIG. 5B is a schematic perspective view for showing an exemplary method to manufacture a core for mounting a port-exhaust manifold assembly according to the present invention.

FIG. 5A is a schematic perspective view for showing a core of a port-exhaust manifold assembly according to various embodiments of the present invention and FIG. 5B is a schematic perspective view for showing how to manufacture a core of a port-exhaust manifold assembly according to various embodiments of the present invention.

As shown in FIG. 5A, the first and third port-exhaust manifold assemblies 124a and 124c are connected to form a female core 160, which are disposed at an exterior portion thereof and the second port-exhaust manifold assembly is connected to form a male core 170.

At this time, the female core 160 is provided with a reception groove 160a with which the male core 170 is correspondingly combined. The reception groove 160a may include the first and third port-exhaust manifold assembly 124a and 124c symmetrically attached each other.

In addition, the male core 170 is formed in correspondence with the reception groove 160a and is provided with a reception groove 170a with which the female core 160 is correspondingly combined.

Continuously, as shown in FIG. 5B, the two port-manifold male and female cores are assembled and the assembled cores are attached to the cylinder head mold so that the cost and time for producing the same may be reduced.

Such a method according to various embodiments of the present invention may be properly used in case that the port-exhaust manifold assemblies are disposed with being piled up one on another in two stories.

Now, a cylinder head connected to a plurality of port-exhaust manifold assembly according to other exemplary embodiments of the present invention will be described with reference to FIG. 6 to FIG. 10B in detail.

Figure 6:
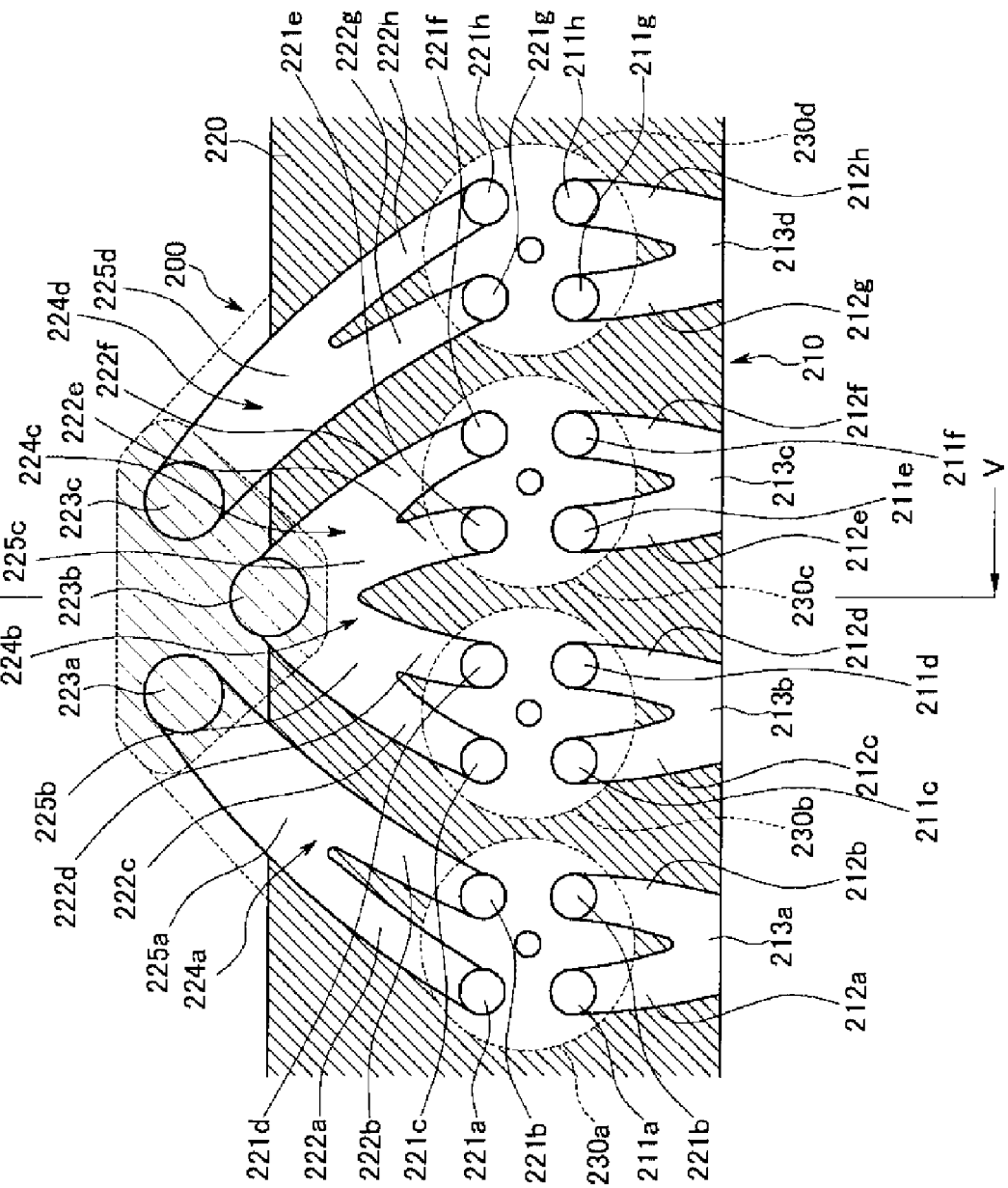
FIG. 6 is a top view of an exemplary cylinder head having a plurality of port-exhaust manifold assemblies according to the present invention.
Figure 7:
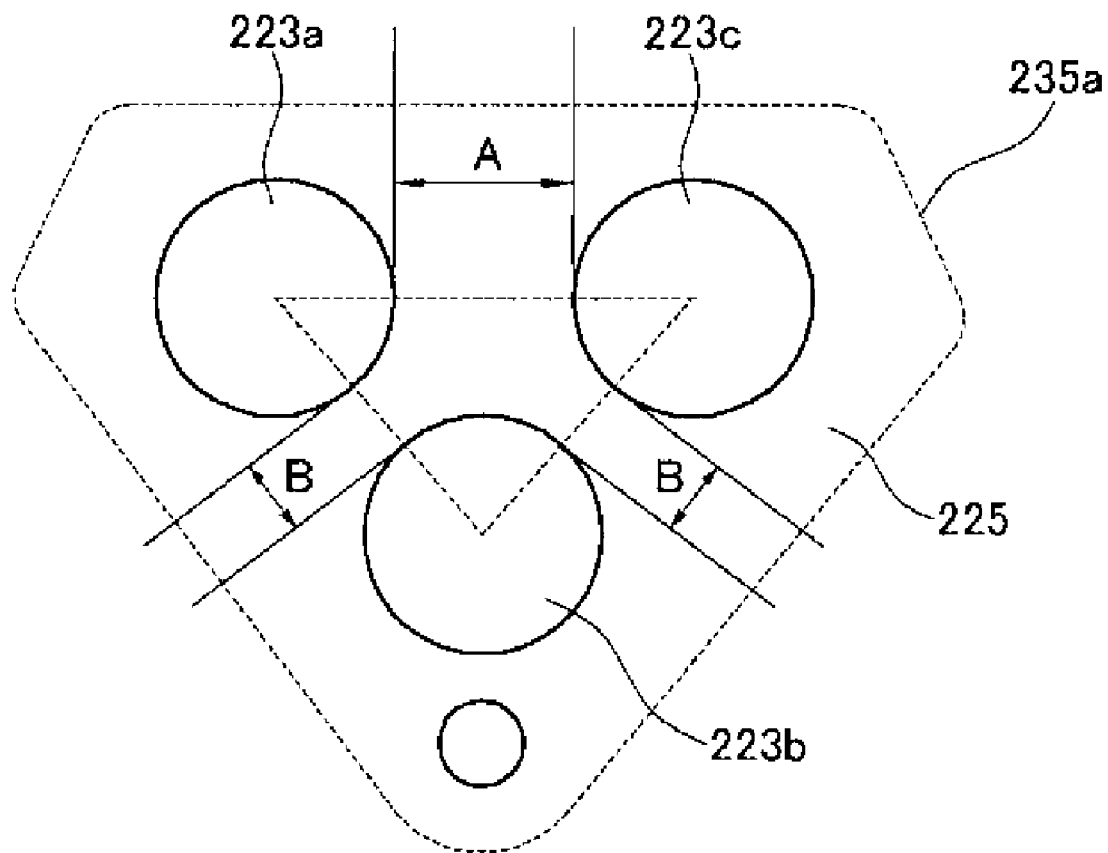
FIG. 7 is a top view for showing an exemplary exhaust port of a cylinder head according to the present invention.
Figure 8:
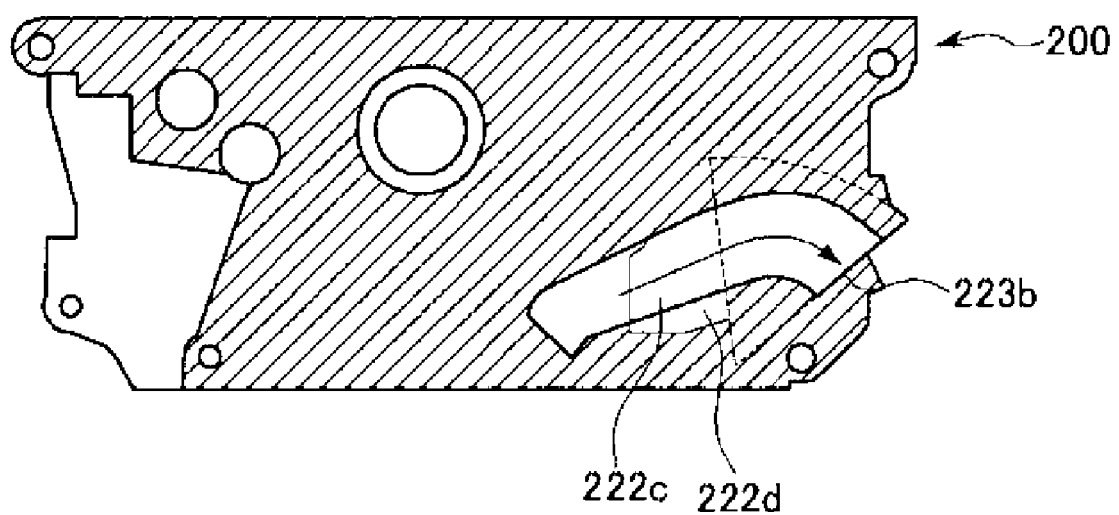
FIG. 8 is a cross-sectional view taken along line V-V of FIG. 6.

FIG. 6 is a top view of a cylinder head having a plurality of port-exhaust manifold assembly according to various embodiments of the present invention, FIG. 7 is a top view for showing an exhaust port of a cylinder head according to various embodiments of the present invention, and FIG. 8 is a cross-sectional view taken along line V-V of FIG. 6.

Firstly, the cylinder head connected to a plurality of port-exhaust manifold assembly according to other exemplary embodiments of the present invention will be described in detail.

According to various embodiments of the present invention, a cylinder head 200 is directed to a cylinder head of an I4 engine in which four cylinders are disposed in series.

According to other exemplary embodiments of the present invention, the cylinder head 200 includes eight intake ports 211a, 211b, 211c, 211d, 211e, 211f, 211g, and 211h communicated with four cylinders 230a, 230b, 230c, 230d at an upper portion of the cylinder block as shown in FIG. 6 to FIG. 8.

The eight intake ports 211a, 211b, 211c, 211d, 211e, 211f, 211g, and 211h are allocated to the first to fourth cylinders 230a, 230b, 230c, 230d such that two intake ports are in correspondence with a single cylinder.

More specifically, the first cylinder 230a is allocated to the first and second intake ports 211a and 211b, the second cylinder 230b is allocated to the third and fourth intake ports 211c and 211d, the third cylinder 230c is allocated to the fifth and sixth intake ports 211e and 211f, and the forth cylinder 230d is allocated to the seventh and eighth intake ports 211g and 211h.

The pair of intake ports 211a, 211b, 211c, 211d, 211e, 211f, 211g, and 211h respectively allocated to each cylinder 230a, 230b, 230c, and 230d are extended toward an intake end portion 210 of the cylinder head to form eight intake flowing lines 212a, 212b, 212c, 212d, 212e, 212f, 212g, and 212h such that they are gathered in a Y-shaped pattern.

At the intake end portion 210 of the cylinder head, a single inlet portion 213a, 213b, 213c, 213d is open in correspondence with each single cylinder 230a, 230b, 230c, and 230d.

Specifically, the first and second intake port 211a and 211b allocated to the first cylinder 230a are extended toward the intake end portion 210 of the cylinder head to form the first and second flowing lines 212a and 212b and the first and second flowing lines 212a and 212b are gathered in a Y-shaped pattern so that they are connected to the first inlet portion 213a at an end portion thereof, the third and fourth intake ports 211c and 211d allocated to the second cylinder 230b are extended toward the intake end portion 210 of the cylinder head to form the third and fourth flowing lines 212c and 212d and the third and fourth flowing lines 212c and 212d are gathered in a Y-shaped pattern so that they are connected to the second inlet portion 213b at an end portion thereof, the fifth and sixth intake ports 211e and 211f allocated to the third cylinder 230c are extended toward the intake end portion 210 of the cylinder head to form the fifth and sixth flowing lines 212e and 212f and the fifth and sixth flowing lines 212e and 212f are gathered in a Y-shaped pattern so that they are connected to a third inlet portion 213c at an end portion thereof, and the seventh and eighth intake ports 211g and 211h allocated to the third cylinder 230d are extended toward the intake end portion 210 of the cylinder head to form the seventh and eighth flowing lines 212g and 212h and the seventh and eighth flowing lines 212g and 212h are gathered in a Y-shaped pattern so that they are connected to a forth inlet portion 213d at an end portion thereof.

Accordingly, each cylinder 230a, 230b, 230c, and 230d has the first to the fourth inlet portions 213a, 213b, 213c, and 213d which are independently communicated with each other and independently open at the intake end portion 210 of the cylinder head.

According to various embodiments of the present invention, the cylinder head 200 includes fourth port-exhaust manifold assemblies 224a, 224b, 224c, 224d which eight exhaust ports 221a, 221b, 221c, 221d, 221e, 221f, 221g, and 221h communicated with the fourth cylinders 230a, 230b, 230c, and 230d are extended to function an exhaust manifold, mounted at the upper portion of the cylinder head as shown in FIG. 6 to FIG. 8.

The eight exhaust ports 221a, 221b, 221c, 221d, 221e, 221f, 221g, and 221h are allocated to the first to fourth cylinders 230a, 230b, 230c, and 230d such that each two of the eight exhaust ports 221a, 221b, 221c, 221d, 221e, 221f, 221g, and 221h are corresponding to the one cylinder. Specifically, the first and second exhaust ports 221a and 221b are allocated to the first cylinder 230a, the third and fourth exhaust ports 221c and 221d are allocated to the second cylinder 230b, the fifth and sixth exhaust ports 221e and 221f are allocated to the third cylinder 230c, and the fifth and sixth exhaust ports 221g and 221h are allocated to the fourth cylinder 230d.

At this time, according to various embodiments of the present invention, the first and second exhaust ports 221a and 221b allocated to the first cylinder 230a are extended toward the exhaust side end portion 220 of the cylinder head to form the first and second outflow lines 222a and 222b and the first and second outflow lines 222a and 222b are gathered in a Y-shaped pattern to form a first exhaust flowing line 225a so that the first exhaust flowing line 225a is connected to the first outlet portion 223a at an end portion thereof, the third and fourth exhaust ports 221c and 221d allocated to the second cylinder 230b are extended toward the exhaust side end portion 220 of the cylinder head to form the third and fourth outflow lines 222c and 222d and the third and fourth outflow lines 222c and 222d are gathered in a Y-shaped pattern to form a second exhaust flowing line 225b so that the second exhaust flowing line 225b is connected to the second outlet portion 223b at an end portion thereof, the fifth and sixth exhaust ports 221e and 221f allocated to the third cylinder 230c are extended toward the exhaust side end portion 220 of the cylinder head to form the fifth and sixth outflow lines 222e and 222f and the fifth and sixth outflow lines 222e and 222f are gathered in a Y-shaped pattern to form a third exhaust flowing line 225c so that the third exhaust flowing line 225c is connected to the second outlet portion 223b at an end portion thereof, and the seventh and eighth exhaust ports 221g and 221h allocated to the fourth cylinder 230d are extended toward the exhaust side end portion 220 of the cylinder head to form the seventh and eighth outflow lines 222g and 222h and the seventh and eighth outflow lines 222e and 222f are gathered in a Y-shaped pattern to form a fourth exhaust flowing line 225d so that the fourth exhaust flowing line 225a is connected to a third outlet portion 223c at an end portion thereof.

Generally, a gasoline I4 engine applies a 4-2-1 exhaust manifold structure in which the first and fourth exhaust flowing lines are gathered; the second and third exhaust flowing lines are gathered and maintained in a constant length so as to achieve the most suitable performance.

However, with such an exhaust manifold structure in case of a cylinder head having a port-exhaust manifold assembly according to other exemplary embodiments of the present invention, the second and the third exhaust flowing lines 225b and 225c are easily gathered but the first and fourth exhaust flowing lines 225a and 225d are not easily gathered due to a long distance between them so that the first and fourth exhaust flowing lines 225a and 225d are rapidly bent and thus may not provide a smooth flow characteristic.

In addition, it is difficult to dispose a water jacket for cooling a periphery portion of the exhaust flowing lines since two outlet portions are disposed in stories up and down.

According to other exemplary embodiments of the present invention, the second and third port-exhaust assemblies 224b and 224c are gathered at an end portion thereof and the first and fourth port-exhaust assemblies 224a and 224d are separated at an end portion thereof.

At this time, a term "port-exhaust manifold assembly" relates to a structure which an exhaust outlet portion is communicated with a pair of exhaust ports though each exhaust flowing lines extended from the pair of exhaust ports.

According to other exemplary embodiments of the present invention, the outlet portions of the port-exhaust manifold assemblies 224a, 224b, 224c, and 224d has a stable triangle structure in that the output portions 223a and 223c of the first and fourth post-exhaust assemblies 224a and 224d are at maximum approached to each other and disposed and then the outlet portion 223b of the gathered second and third post-exhaust assemblies 224b and 224c are disposed at a lower portion of the outlet portions 223a and 223c of the first and fourth post-exhaust assemblies 224a and 224d as shown in FIG. 7.

As shown in FIG. 8, the first to third exhaust flowing lines 225a, 225b, and 225c are bent with 30° to 60° downward to the exhaust side end portion 220 of the cylinder head. It is preferable that the outlet portions 223a, 223b, and 223c of the port-exhaust manifold assemblies are disposed at the closest to catalyzing means.

The cylinder head having the integrally formed port-exhaust manifold according to other exemplary embodiments of the present invention may provides a semi 4-2-1 exhaust flowing line in which the second and third exhaust flowing lines 225b and 225c are gathered at an end portion thereof and the first and fourth exhaust flowing lines 225a and 225d are separated at an end portion thereof so that it has the same performance at a low and middle velocity as the traditional 4-2-1 exhaust manifold structure and also insure a compact exhaust outlet shape to largely reduce an entire size of the cylinder head having the integrally formed port-exhaust manifold.

Accordingly, the cylinder head 200 has an outer wall portion enlarged by a height A of a triangle-shaped flange portion 225 such that it includes the first to the third port-exhaust manifold assemblies 224a, 224b, and 224c directly connected to the diffuser of a front portion of the catalytic converter which is disposed at an external portion thereof.

At this time, the first to fourth exhaust flowing lines 225a, 225b, 225c, and 225d of the port-exhaust manifold assemblies 224a, 224b, and 224c may be bent or not be bent toward the catalytic converter as shown in FIG. 8.

When the traditional exhaust ports are extended to the diffuser disposed at a front portion of the catalytic converter to form the port-exhaust manifold assemblies 224a, 224b, and 224c in this manner, a distance of between the cylinder head 200 and the catalyzing means may be shortened and a catalyzing means activation start temperature (LOT; Light of Temperature) may be lowered so that engine displacement may be reduced.

In addition, the traditional exhaust manifold additionally composed of a high density of iron material is integrally formed in the cylinder head 200 which is manufactured by a low density of aluminum alloy so that the elimination of the exhaust manifold may reduce production cost and the entire weight of the engine may be reduced.

In addition, the first to third outlet portions 223a, 223b, and 223c of the port-exhaust manifold assemblies 124a, 124b, and 124c are disposed with being piled up one on another in two stories and they are entirely composed of a triangle when they are connected based on the center of the outlet portions.

The two of them may be selectively disposed at an upper story or at a lower story.

Accordingly, the degree of interference freedom may be increased and such arrangement may insure the most compact shape of the exhaust outlet flange 225 so that entire size of the cylinder head integrally formed with the exhaust port and the exhaust manifold may be largely reduced.

At this time, each distance A and B between each outlet portion 223a, 223b, and 223c may be in range of at least approximately 3 to 15 mm.

Each distance A and B between each outlet portion 223a, 223b, and 223c is determined considering a cooling performance according to an arrangement of cooling means.

That is, an exhaust temperature may be reduced to at most 100° C. according to a size of a waterjacket so that it may largely a thermal durability compared to the traditional exhaust manifold.

In addition, the cooling means 240 arc disposed among each outlet portion 223a, 223b, and 223c so that the entire size of the engine may be compacted as well as the good cooing efficiency may be provided.

The structure of the cylinder head having a port-exhaust manifold assembly according to various embodiments of the present invention may simultaneously optimize an arrangement of the cooling means.

That is, the entire size of the cylinder head may be compacted and simultaneously the thermal durability of between each port-exhaust manifold assembly may be insured.

The cooling means according to various embodiments of the present invention will be described with reference to FIG. 9A to FIG. 9C.

Figure 9A:
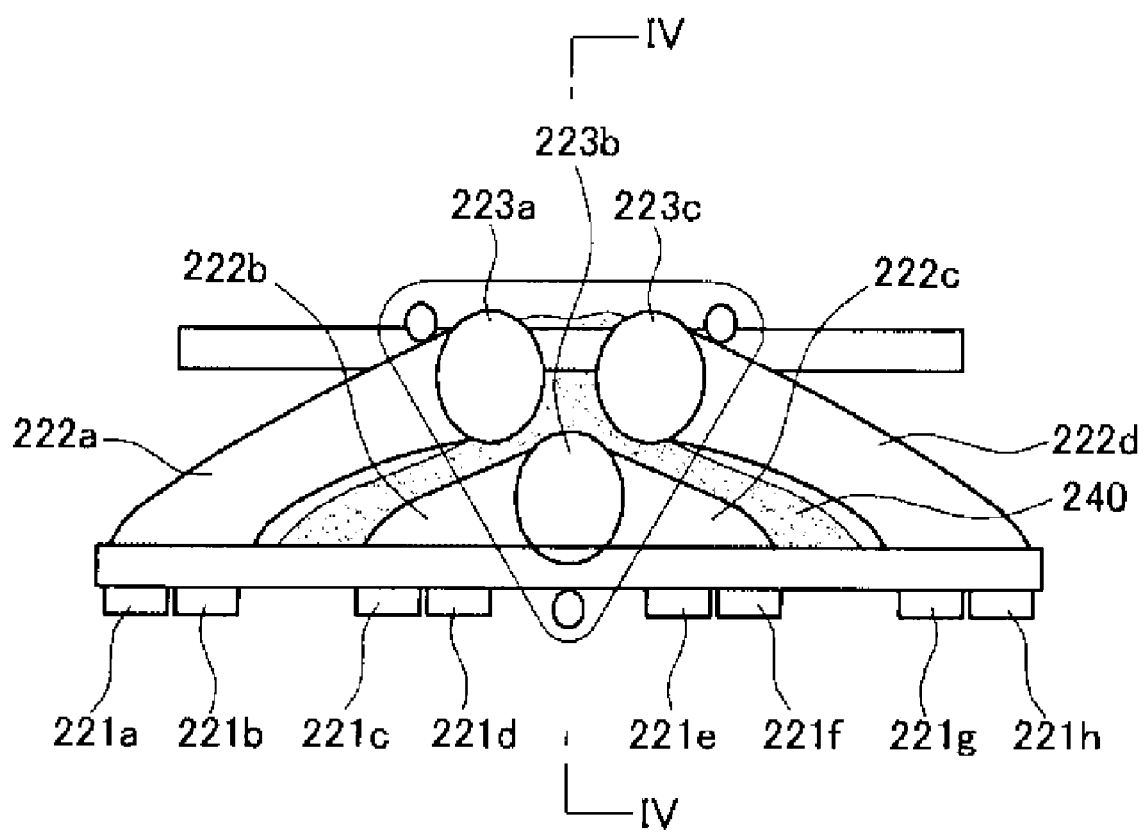
FIG. 9A is a top view for showing an exemplary arrangement of a water jacket surrounding an exhaust port of a cylinder head according to of the present invention.
Figure 9B:
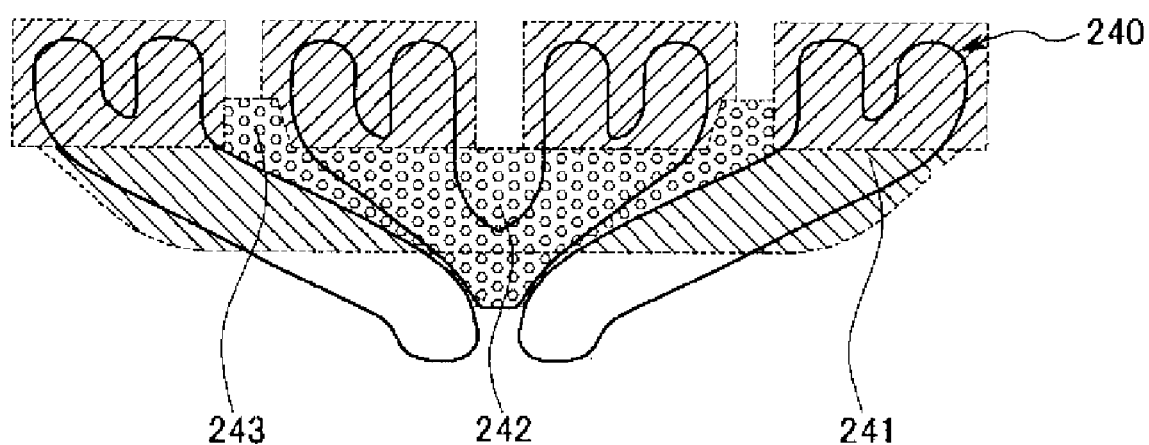
FIG. 9B is a front view for showing an exemplary arrangement of a water jacket surrounding an exhaust port of a cylinder head according to the present invention.
Figure 9C:
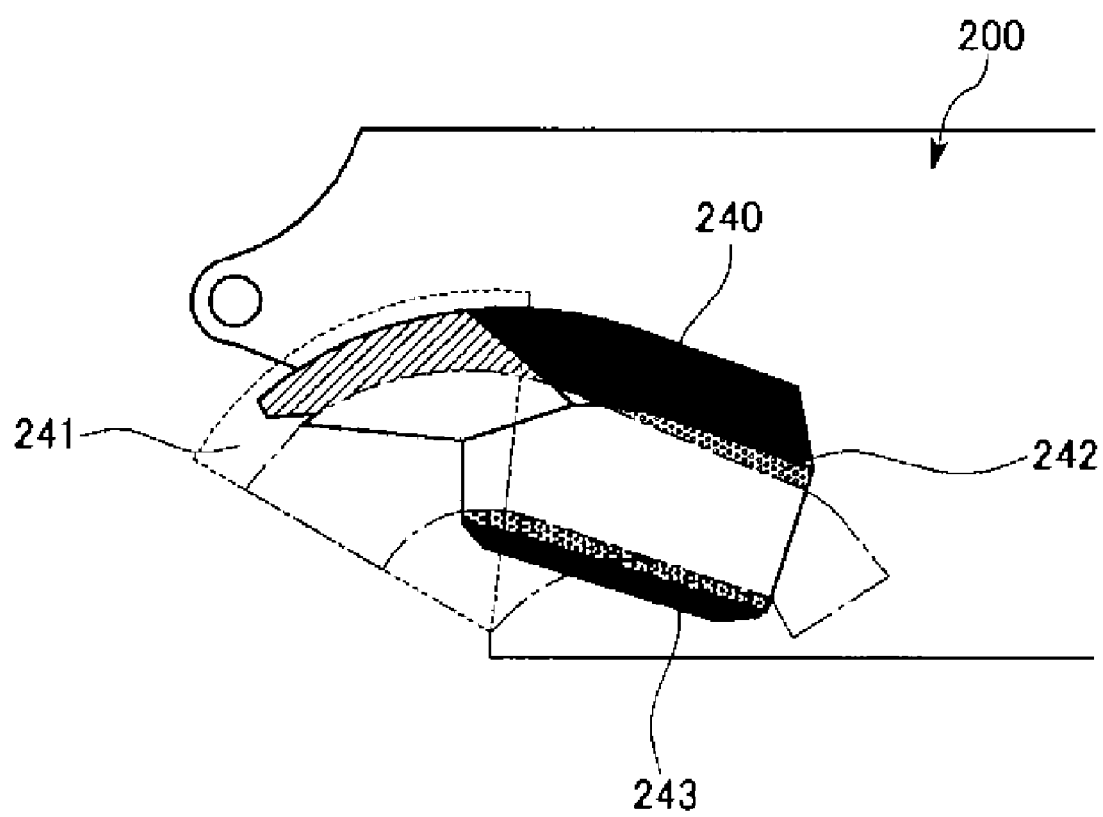
FIG. 9C is a cross-sectional view taken along line IV-IV of FIG. 9A.

FIG. 9A is a top view for showing a disposition of a water jacket in an exhaust port of a cylinder head according to various embodiments of the present invention, FIG. 9B is a front view for showing a disposition of a water jacket in an exhaust port of a cylinder head according to various embodiments of the present invention, and FIG. 9C is a cross-sectional view taken along line IV-IV of FIG. 9A.

In the cylinder head 200 according to various embodiments of the present invention, since the port-exhaust manifold assemblies 224a, 224b, and 224c are disposed with being piled up one on another in two stories, a sunken space portion is formed between the first and third port-exhaust manifold assemblies 224a and 224c and at a upper portion of the second port-exhaust manifold assembly 224b so that the water jacket may be inserted into the sunken space without making additional space as shown in FIG. 9A to FIG. 9C.

Essentially, the cooling means 240 is a waterjacket, which includes a first cooling portion 241 disposed at the upper portion of the three port-exhaust manifold assemblies 224a, 224b, and 224c, a second cooling portion 242 extended according to the first though fourth exhaust flowing lines 225a, 225b, 225c, and 225d from the first cooling portion 241 such that it is disposed at a sunken space of the upper portion of the second port-exhaust manifold assembly 124b which is arranged between the first and third port-exhaust manifold assemblies 124a and 124c, and a third cooling portion 243 probably extended to the outlet portions 223a, 223b, and 223c of the three port-exhaust manifold assemblies 224a, 224b, and 224c from the second cooling portion 242.

How to improve a productivity of the port-exhaust manifold assembly according to various embodiments of the present invention will be described with reference to FIG. 10A and FIG. 10B.

Figure 10A:
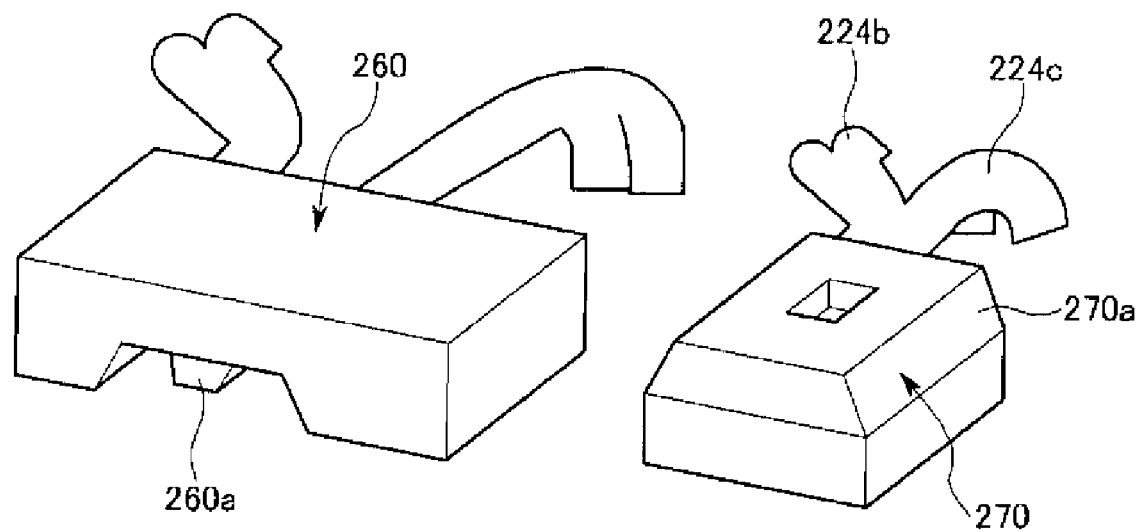
FIG. 10A is a schematic perspective view for showing an exemplary core of mounting a port-exhaust manifold assembly in an cylinder head according to the present invention.
Figure 10B:
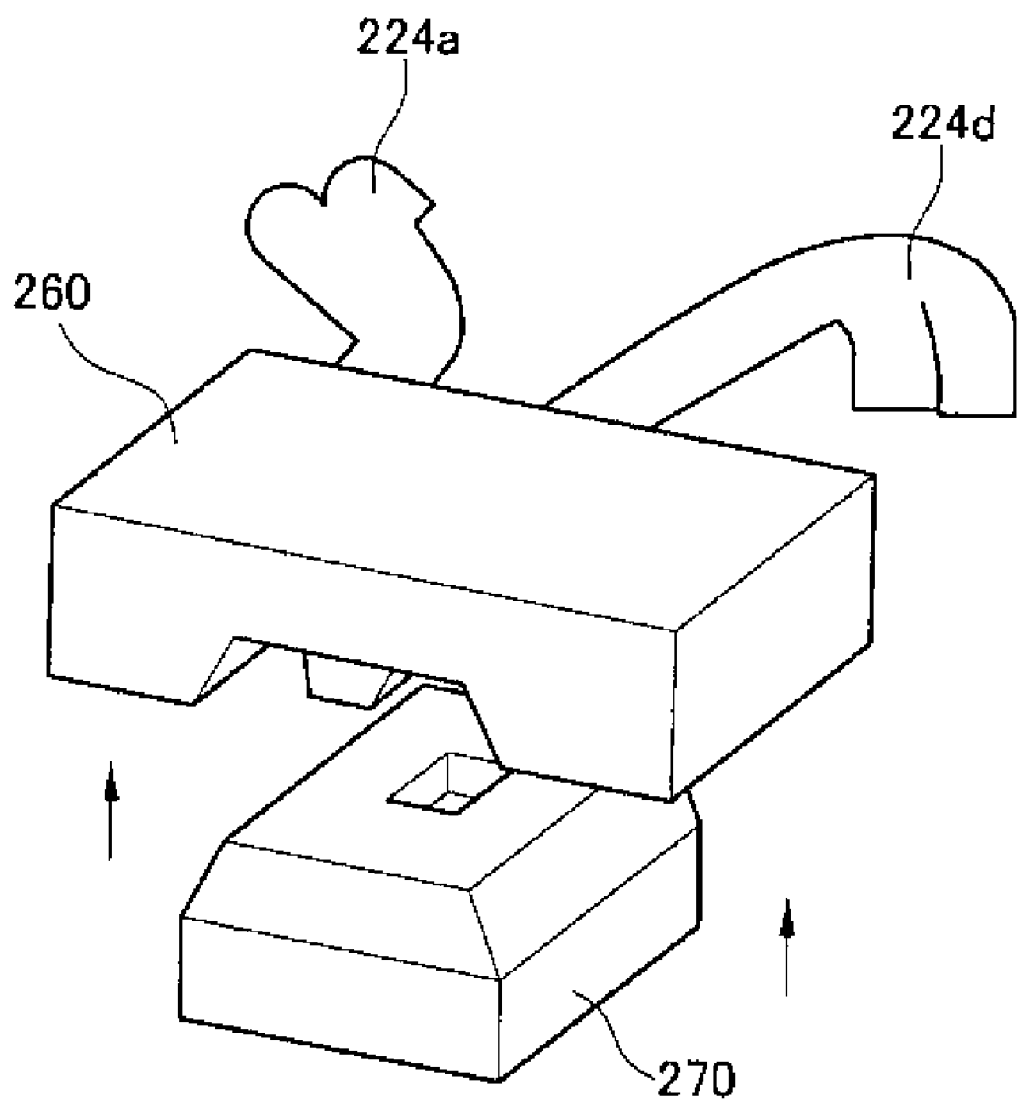
FIG. 10B is a schematic perspective view for showing an exemplary method of manufacturing a core for mounting a port-exhaust manifold assembly according to the present invention.

FIG. 10A is a schematic perspective view for showing a core of a port-exhaust manifold assembly according to various embodiments of the present invention and FIG. 10B is a schematic perspective view for showing how to manufacture a core of a port-exhaust manifold assembly according to various embodiments of the present invention.

As shown in FIG. 10A, the first and second port-exhaust manifold assemblies 224a and 224b disposed at an external portion are connected to a female core 260 and the third port-exhaust manifold assembly disposed at a center portion is connected to a male core 270.

At this time, the female core 260 is provided with a reception groove 260a with which the male core 270 is correspondingly combined. The reception groove 260a may include the first and third port-exhaust manifold assembly 224a and 224c symmetrically attached each other.

In addition, the male core 270 is formed in correspondence with the reception groove 260a and is provided with a reception groove 270a with which the female core 260 is correspondingly combined.

Continuously, as shown in FIG. 10B, the two port-manifold male and female cores are assembled and the assembled cores are attached to the cylinder head mold so that the cost and time for producing the same may be reduced.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cylinder head having a plurality of integrally formed port-exhaust manifold assemblies therein, wherein each port-exhaust manifold assembly is integrally formed in the cylinder head by extending a plurality of exhaust ports of an engine to function as an exhaust manifold, and the plurality of the port-exhaust manifold assemblies is arranged in a triangle when each center portion of outlet portions thereof are connected.

2. The cylinder head having a plurality of integrally formed port-exhaust manifold assemblies of claim 1, wherein at least one of the port-exhaust manifold assemblies is disposed upward and the others are disposed downward such that the plurality of integrally formed port-exhaust manifold assemblies are piled one to another in two stories.

3. The cylinder head having a plurality of integrally formed port-exhaust manifold assemblies of claim 1, wherein the cylinder head includes an enlarged portion enlarged by a height of the triangle so as to surround the outlet portions of the port-exhaust manifold assembly.

4. The cylinder head having a plurality of integrally formed port-exhaust manifold assemblies of claim 1, wherein the port-exhaust manifold assembly includes an exhaust flowing line disposed in straight or bent.

5. The cylinder head having a plurality of integrally formed port-exhaust manifold assemblies of claim 1, wherein a distance between the outlet portions of the plurality of the port-exhaust manifold assemblies is determined in a range of approximately 3 to 15 mm considering a cooling performance.

6. The cylinder head having a plurality of integrally formed port-exhaust manifold assemblies of claim 1, further comprising a female core for mounting the port-exhaust manifold assemblies disposed at an external portion and a male core for mounting the port-exhaust manifold assemblies disposed at a center portion.

7. The cylinder head having a plurality of integrally formed port-exhaust manifold assemblies of claim 6, wherein the cylinder heads includes six port-exhaust manifold assemblies as a V6 engine in which six cylinders are disposed in a V-shaped pattern such that each three cylinders are arranged at an angle of 60° at left and right sides based on a center line, each pair of exhaust ports among twelve exhaust ports thereof are extended to form 6 pair of Y-shaped exhaust inlet lines to function as a exhaust manifold, the first to third port-exhaust manifold assemblies disposed at the same exhaust end portion based on the center line among the six port-exhaust manifold assemblies are disposed with being piled up one on another in two stories to be entirely composed of a triangle when they are connected based on the center of the outlet portions.

8. The cylinder head having a plurality of integrally formed port-exhaust manifold assemblies of claim 7, comprising a cooling means in a sunken space portion which is formed between the two exhaust manifold assemblies disposed at an exterior portion thereof and the upper portion of the port-exhaust manifold assembly at a center portion thereof.

9. The cylinder head having a plurality of integrally formed port-exhaust manifold assemblies of claim 8, wherein the cooling means is a water jacket which includes a first cooling portion enlarged than the traditional water jacket as to surround the upper portion of the three port-exhaust manifold assemblies, a second cooling portion enlarged from the first cooling portion such that it is disposed at a sunken space of the upper portion of the second port-exhaust manifold assembly which is arranged between the first and third port-exhaust manifold assemblies, and a third cooling portion probably extended to the outlet portions of the three port-exhaust manifold assemblies from the second cooling portion, and a fourth cooling portion extended from the second cooling portion such that it is connected with the first cooling portion disposed at a lower portion of each exhaust port.

10. The cylinder head having a plurality of integrally formed port-exhaust manifold assemblies of claim 8, wherein the female core is provided with a reception groove with which the male core is correspondingly combined such that the first and third port-exhaust manifold assemblies and are symmetrically attached each other and the male core is formed in correspondence with the reception groove and is provided with a reception groove with which the female core is correspondingly combined.

11. The cylinder head having a plurality of integrally formed port-exhaust manifold assemblies of claim 7, wherein the cylinder head has four port-exhaust manifold assemblies in which each adjacent pair exhaust ports among eight exhaust ports of an I4 engine are gathered at an end portion thereof to form four Y-shaped exhaust lines to function as exhaust manifold and the first to third outlet portions of the port-exhaust manifold assemblies are disposed with being piled up one on another in two stories and they are entirely composed of a triangle when they are connected based on the center of the outlet portions.

12. The cylinder head having a plurality of integrally formed port-exhaust manifold assemblies of claim 11, wherein the three port-exhaust manifold assemblies includes a first port-exhaust manifold assembly having an first outlet portion at an end portion of the first exhaust flowing line disposed at one exterior portion among the four exhaust flowing lines, a second port-exhaust manifold assembly having a second outlet portion at an end portion of the fourth exhaust flowing line disposed at the other exterior portion among the four exhaust flowing lines, and a third port-exhaust manifold assembly having a third outlet portion at an end portion in which the second and third exhaust flowing lines disposed at a center thereof are gathered.

13. The cylinder head having a plurality of integrally formed port-exhaust manifold assemblies of claim 11, wherein the first and second port-exhaust manifold assemblies are disposed upward and then the third port-exhaust manifold assembly disposed at the center portion thereof is disposed down the first and second port-exhaust manifold assemblies in two stories.

14. The cylinder head having a plurality of integrally formed port-exhaust manifold assemblies of claim 11, wherein the first through fourth exhaust flowing lines are bent at approximately 30° through approximately 60° according to a position of a catalyzing means.

15. The cylinder head having a plurality of integrally formed port-exhaust manifold assemblies of claim 11, comprising a cooling means in a sunken space portion which is formed between the two exhaust manifold assemblies disposed at an external portion and the upper portion of the port-exhaust manifold assembly at a center portion.

16. The cylinder head having a plurality of integrally formed port-exhaust manifold assemblies of claim 15, wherein the cooling means is a water jacket which includes a first cooling portion enlarged than the traditional water jacket as to surround the upper portion of the three port-exhaust manifold assemblies, a second cooling portion enlarged from the first cooling portion such that it is disposed at a sunken space of the upper portion of the second port-exhaust manifold assembly which is arranged between the first and third port-exhaust manifold assemblies, and a third cooling portion probably extended to the outlet portions of the three port-exhaust manifold assemblies from the second cooling portion.

17. The cylinder head having a plurality of integrally formed port-exhaust manifold assemblies of claim 11, wherein the female core is provided with a reception groove with which the male core is correspondingly combined such that the first and third port-exhaust manifold assemblies and are symmetrically attached each other and the male core is formed in correspondence with the reception groove and is provided with a reception groove with which the female core is correspondingly combined.

18. The cylinder head having a plurality of integrally formed port-exhaust manifold assemblies of claim 17, wherein the female core is provided with a reception groove with which the male core is correspondingly combined such that the first and third port-exhaust manifold assemblies and are symmetrically attached each other and the male core is formed in correspondence with the reception groove and is provided with a reception groove with which the female core is correspondingly combined.

\* \* \* \* \*